United States Patent [19]

Sherritt

[11] Patent Number: 4,899,230

[45] Date of Patent: Feb. 6, 1990

[54] TAPED DATA COPYING UTILIZING MULTIPLE ADDRESSABLE MEMORIES

[75] Inventor: Jay G. Sherritt, Boulder, Colo.

[73] Assignee: IDB Corporation, Boulder, Colo.

[21] Appl. No.: 137,523

[22] Filed: Dec. 22, 1987

[51] Int. Cl.[4] .............................................. G11B 5/86
[52] U.S. Cl. .................................................... 360/15
[58] Field of Search ............... 360/15, 16, 17; 369/84, 369/85

[56] References Cited

U.S. PATENT DOCUMENTS

| 3,805,284 | 4/1974 | Coon, Jr. et al. |
| 4,320,486 | 3/1982 | Cooley et al. |
| 4,375,655 | 3/1983 | Korth et al. |
| 4,410,917 | 10/1983 | Newdoll et al. |
| 4,618,897 | 10/1986 | Johnson et al. |
| 4,758,902 | 7/1988 | Okamoto et al. ...................... 360/15 |

FOREIGN PATENT DOCUMENTS 2013865  1/1983  United Kingdom .................. 360/15

Primary Examiner—Vincent P. Canney
Attorney, Agent, or Firm—Robert E. Harris

[57] ABSTRACT

Taped data copying is disclosed having the capability of high speed simultaneous generation of multiple data copies. Storage media, for example magnetic tape, having data, normally in digital form, recorded thereon is read at a master unit and electrical signals indicative of the data is generated and broadcast over a computer bus to a plurality of addressable memory units where data-indicative information is simultaneously written into the plurality of memory units. Each memory unit is connected with a different associated one of a plurality of magnetic tape-containing data copying units so that data-indicative information stored in each memory unit is read and reliably copied onto the tape at the associated data copying unit. A processing unit is included to control writing information into the memory units, reading information stored in the memory units, and verifying the integrity and content of data copies.

21 Claims, 19 Drawing Sheets

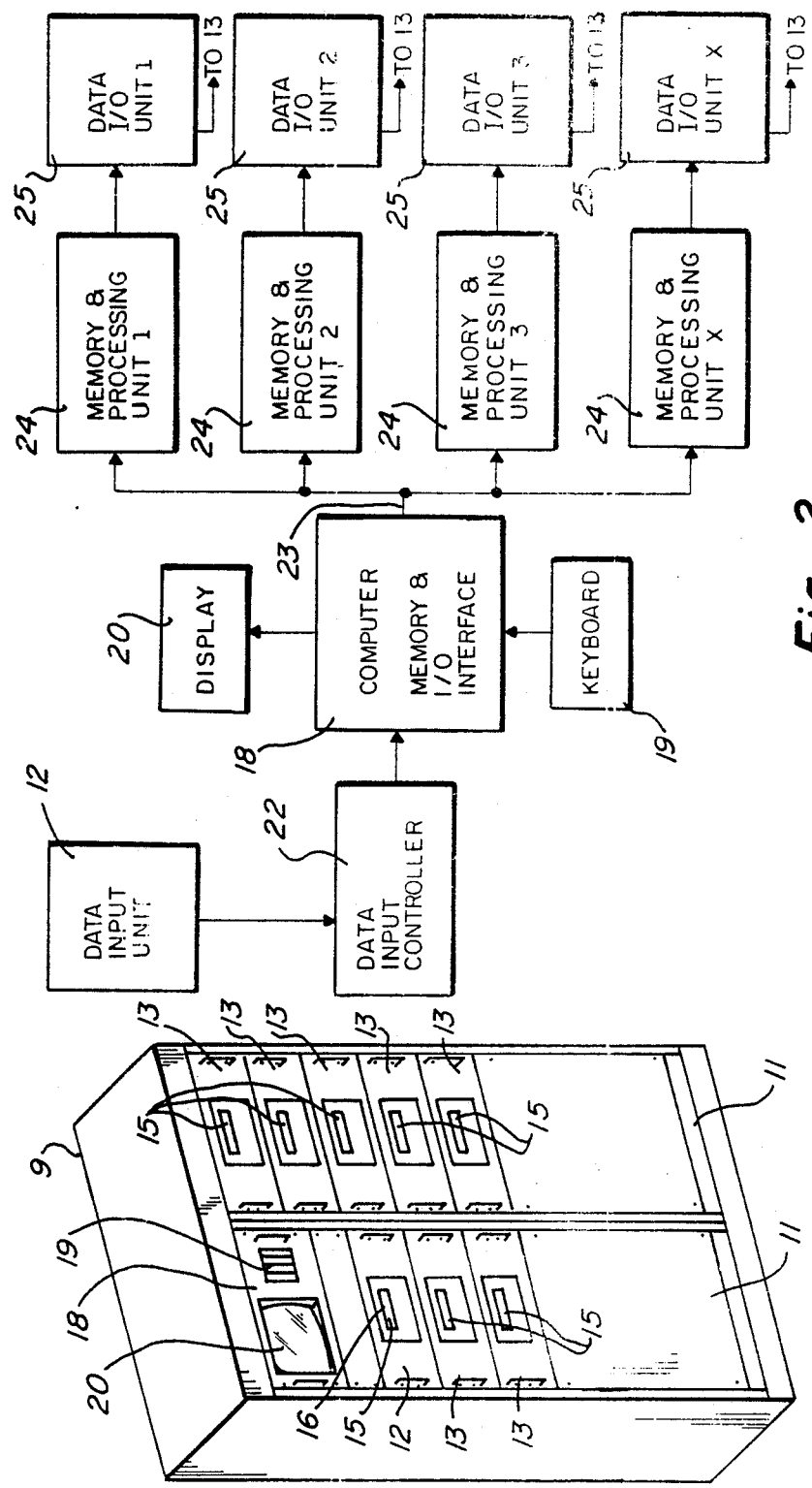

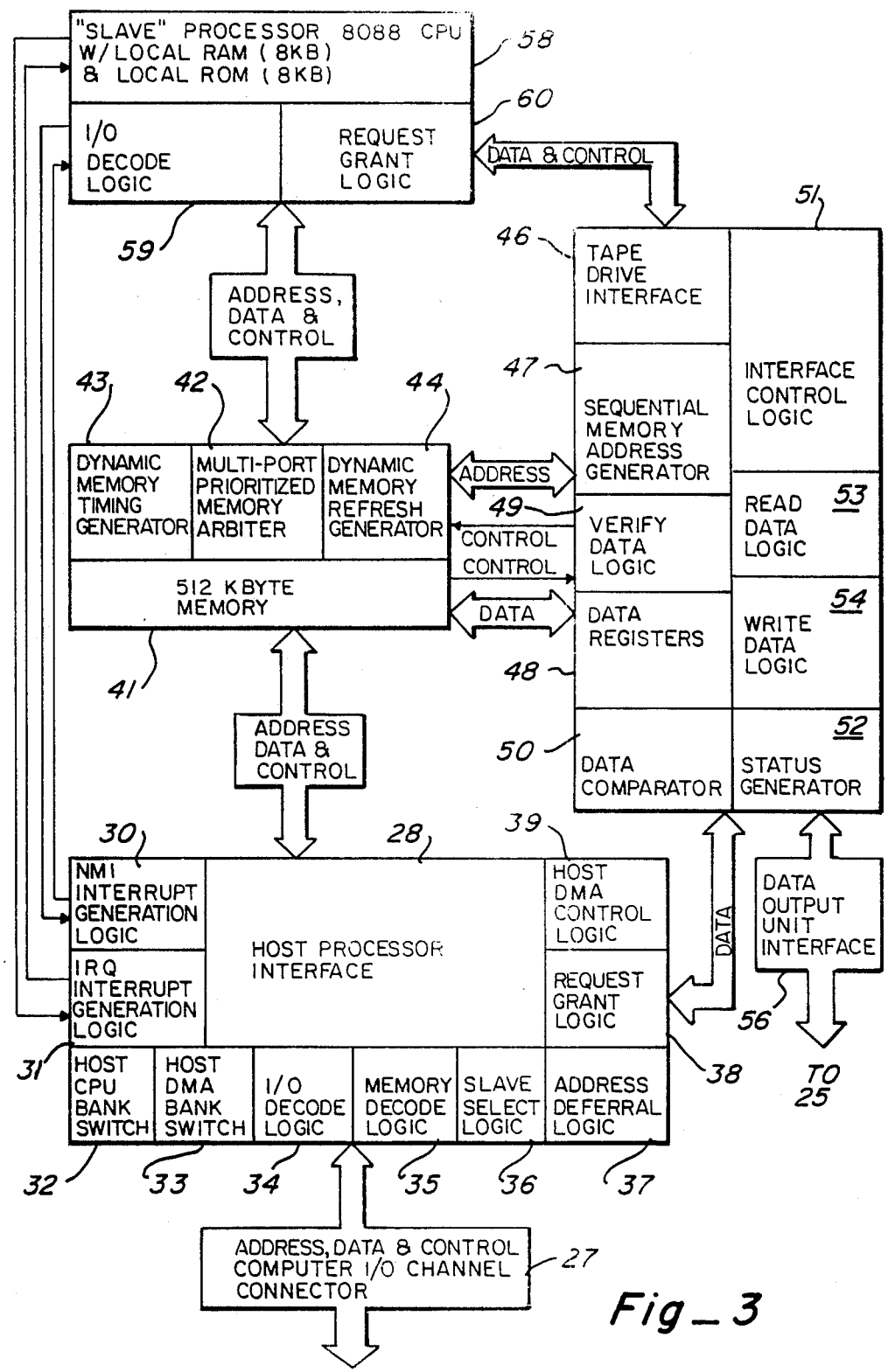
Fig_3

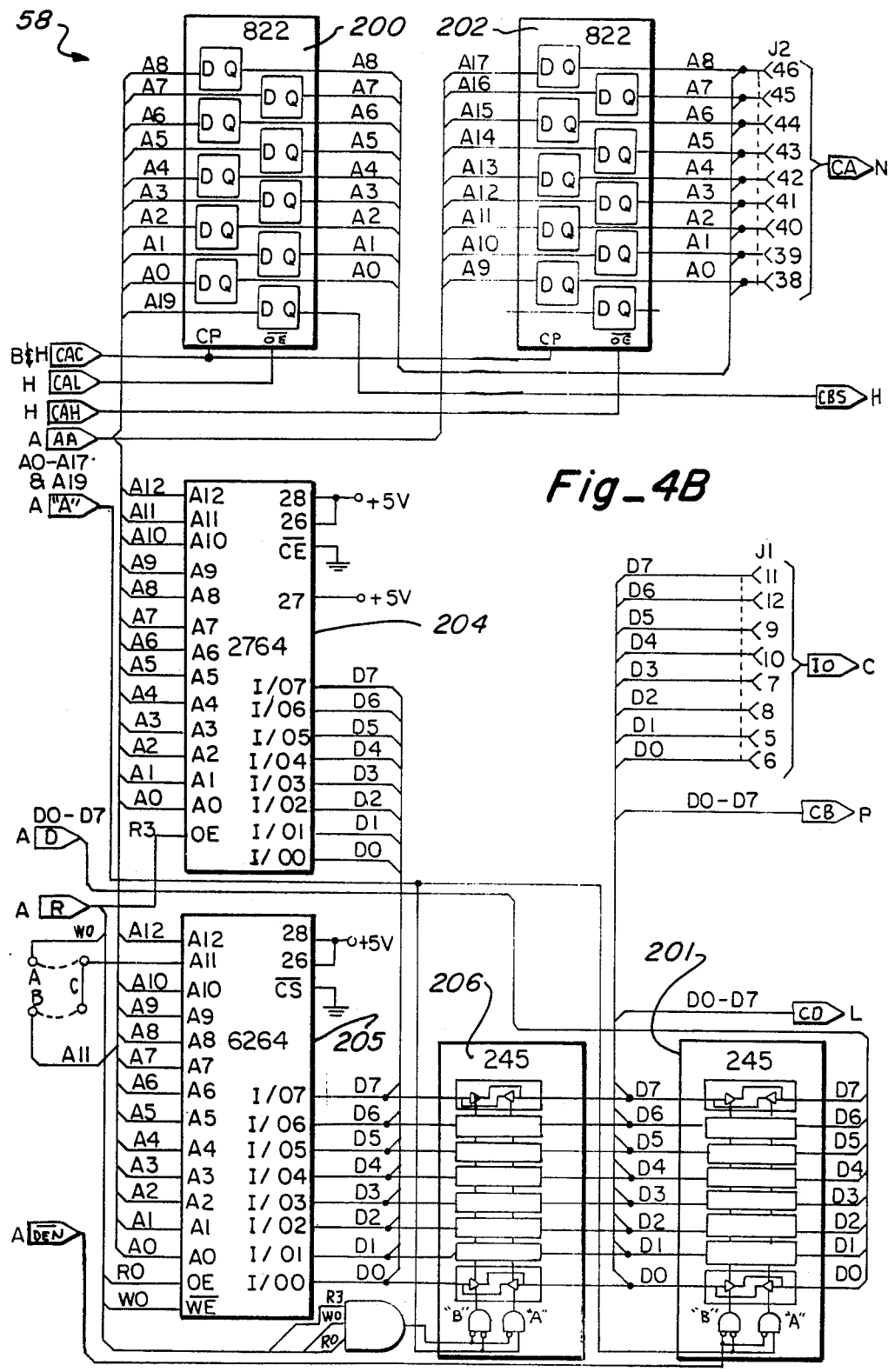
Fig_4B

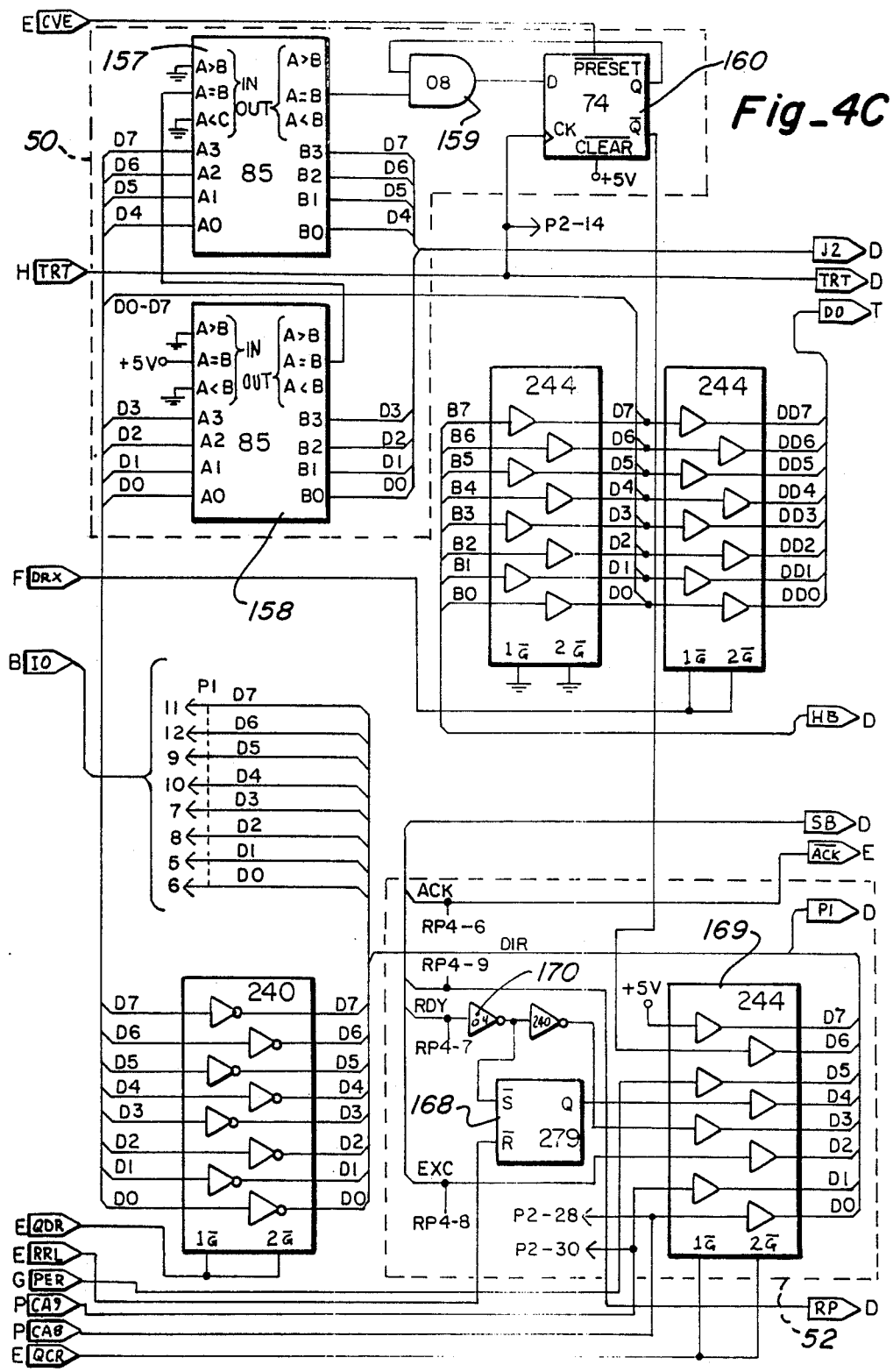
Fig_4C

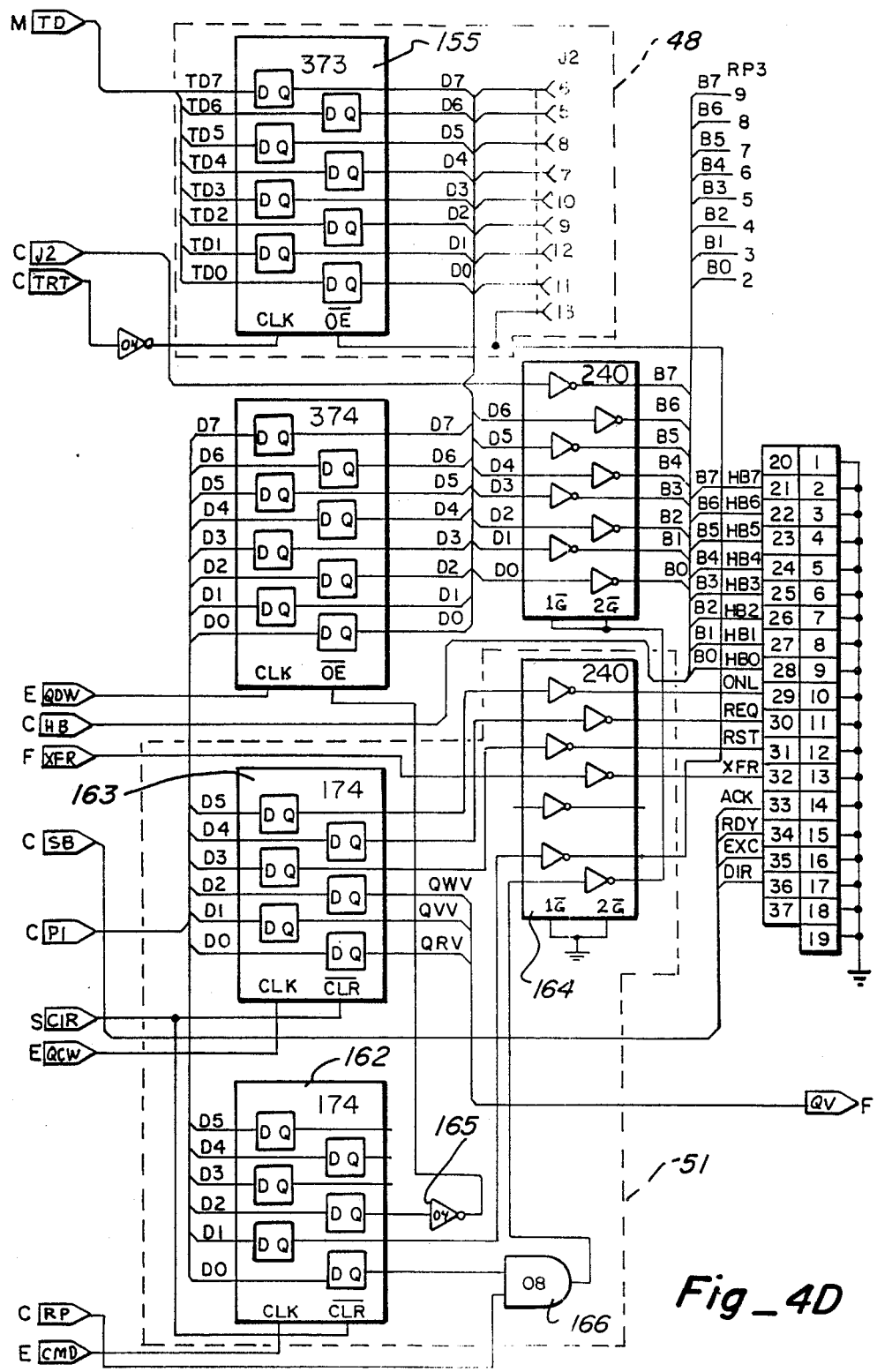
Fig_4D

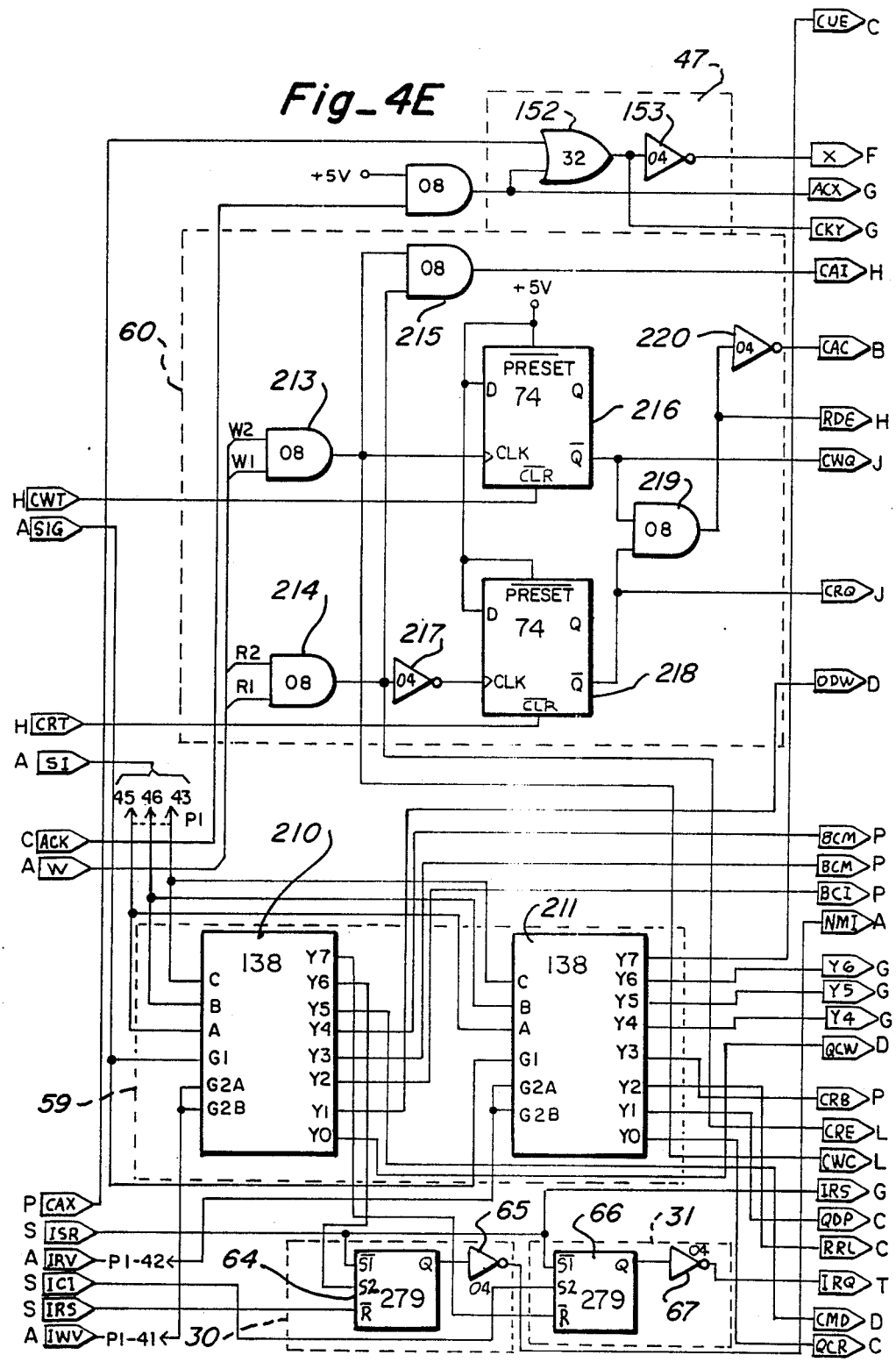
Fig_4E

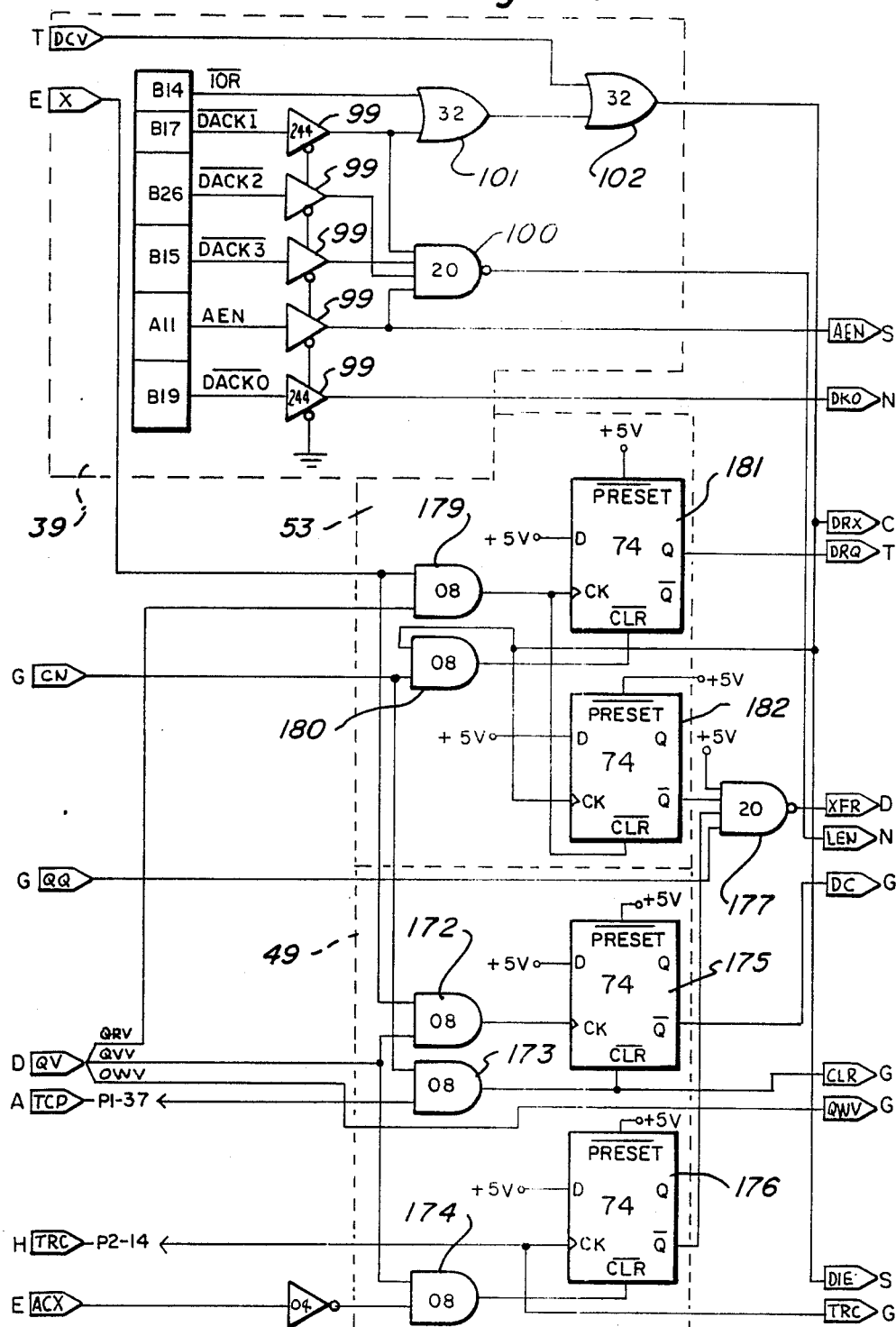
Fig_4F

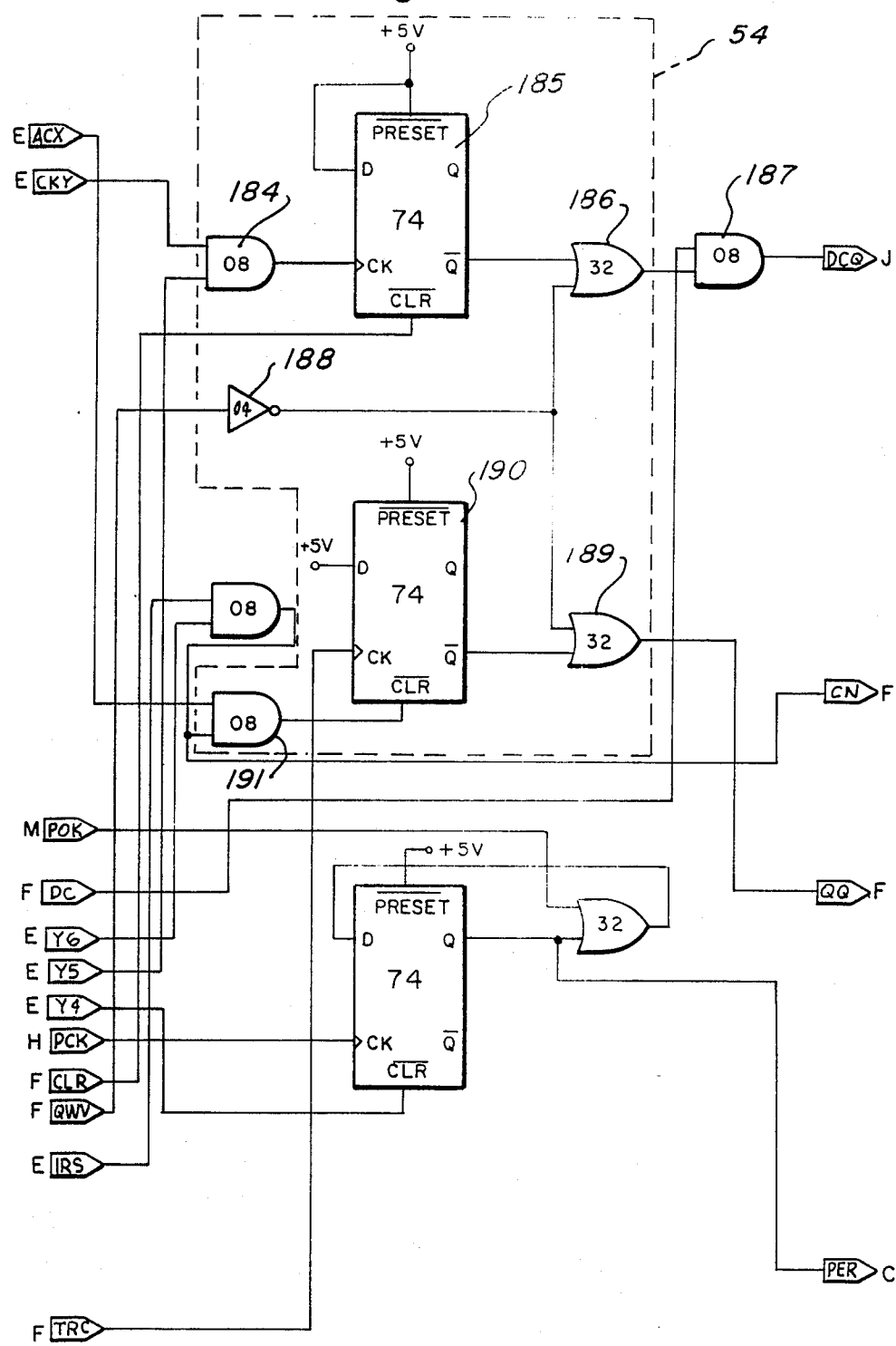
Fig_4G

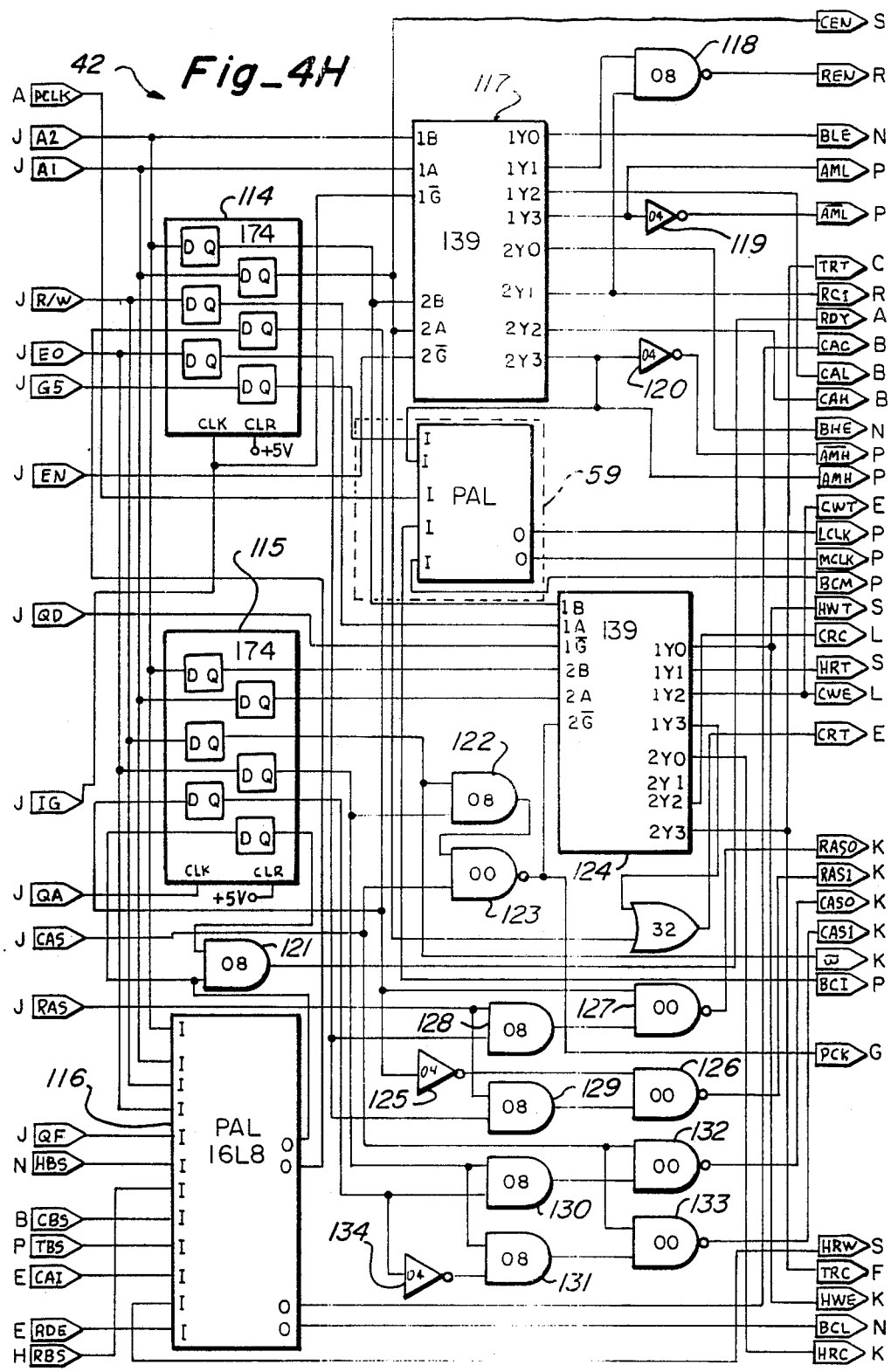
Fig_4H

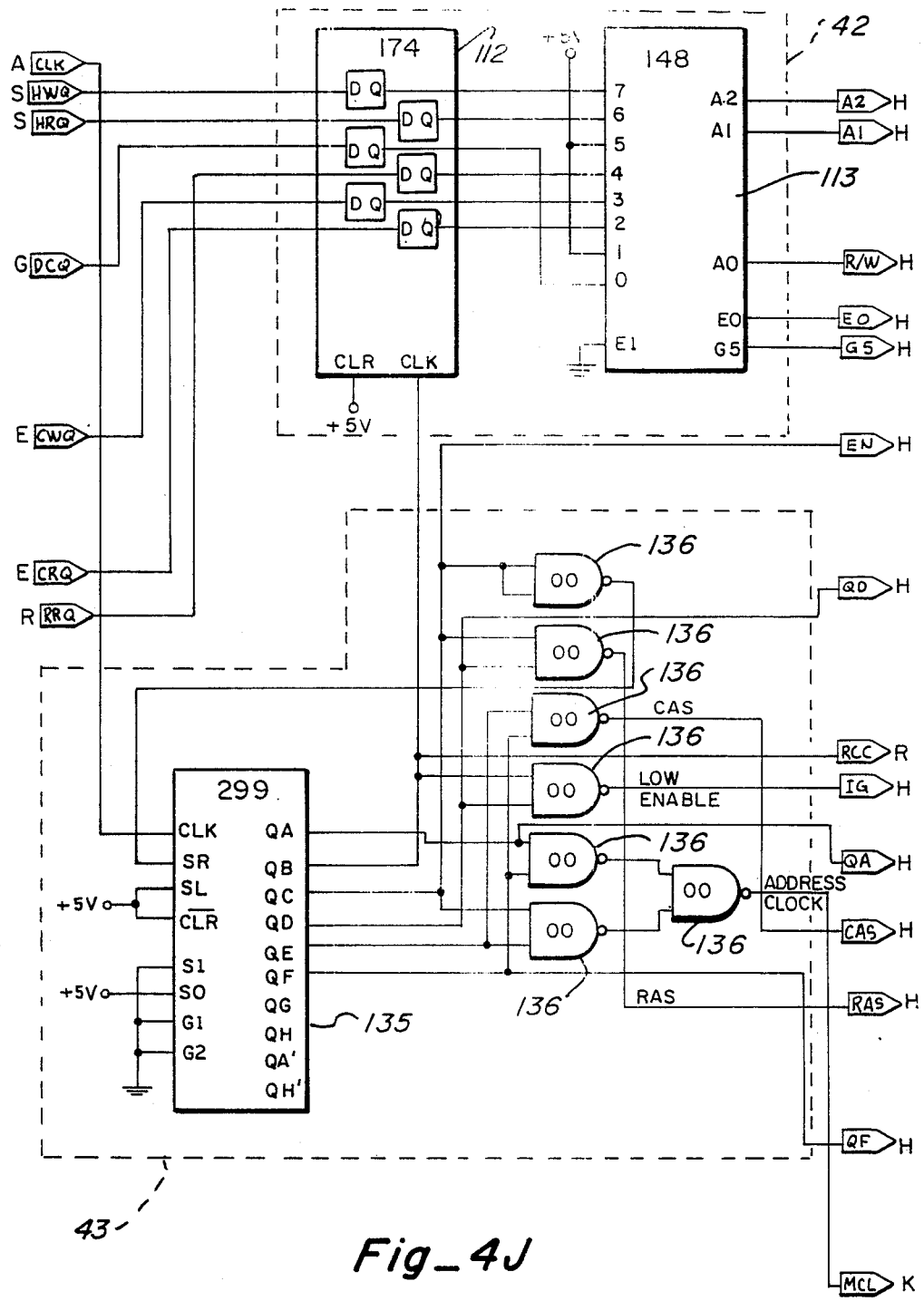
Fig_4J

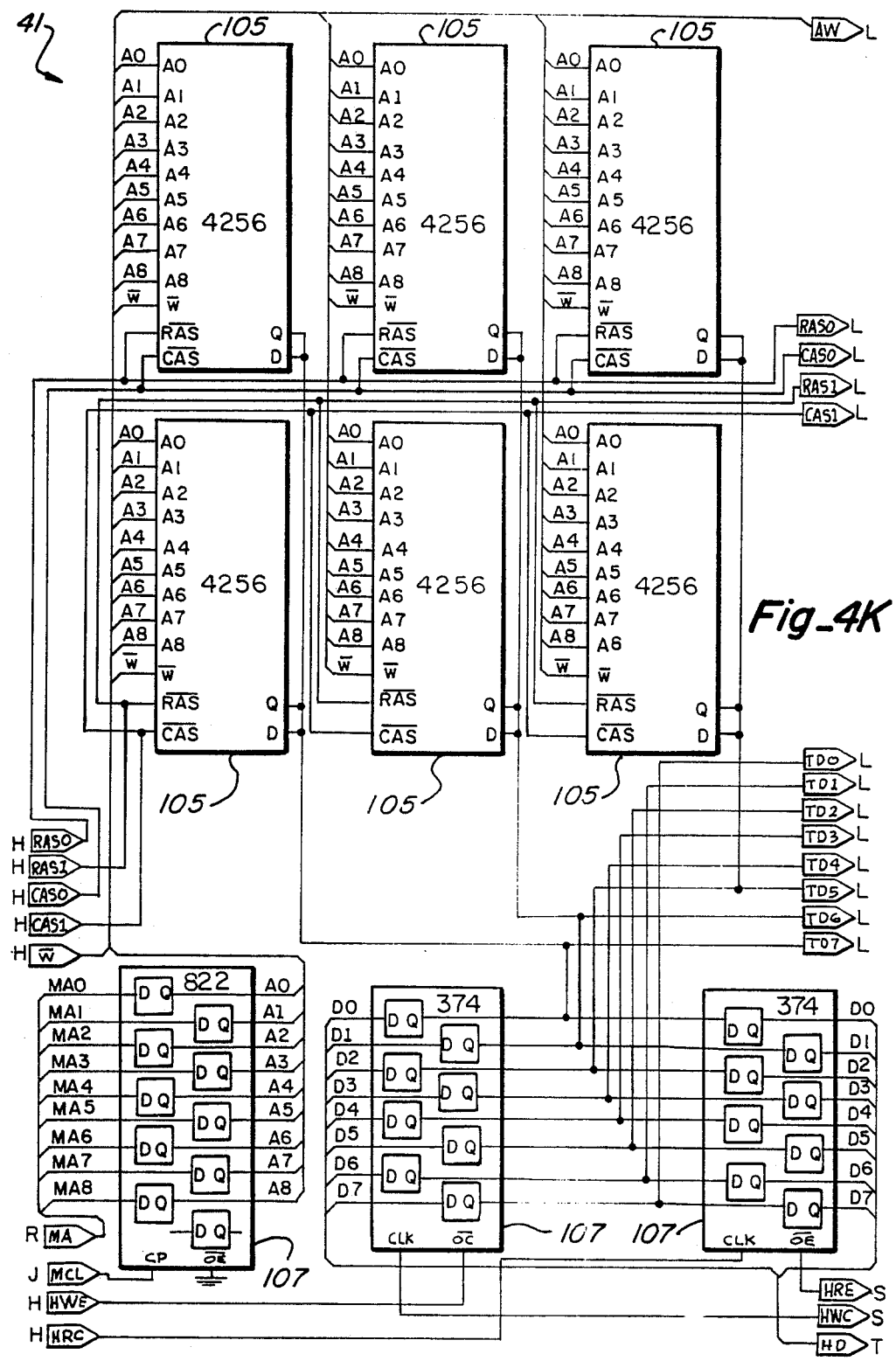
Fig_4K

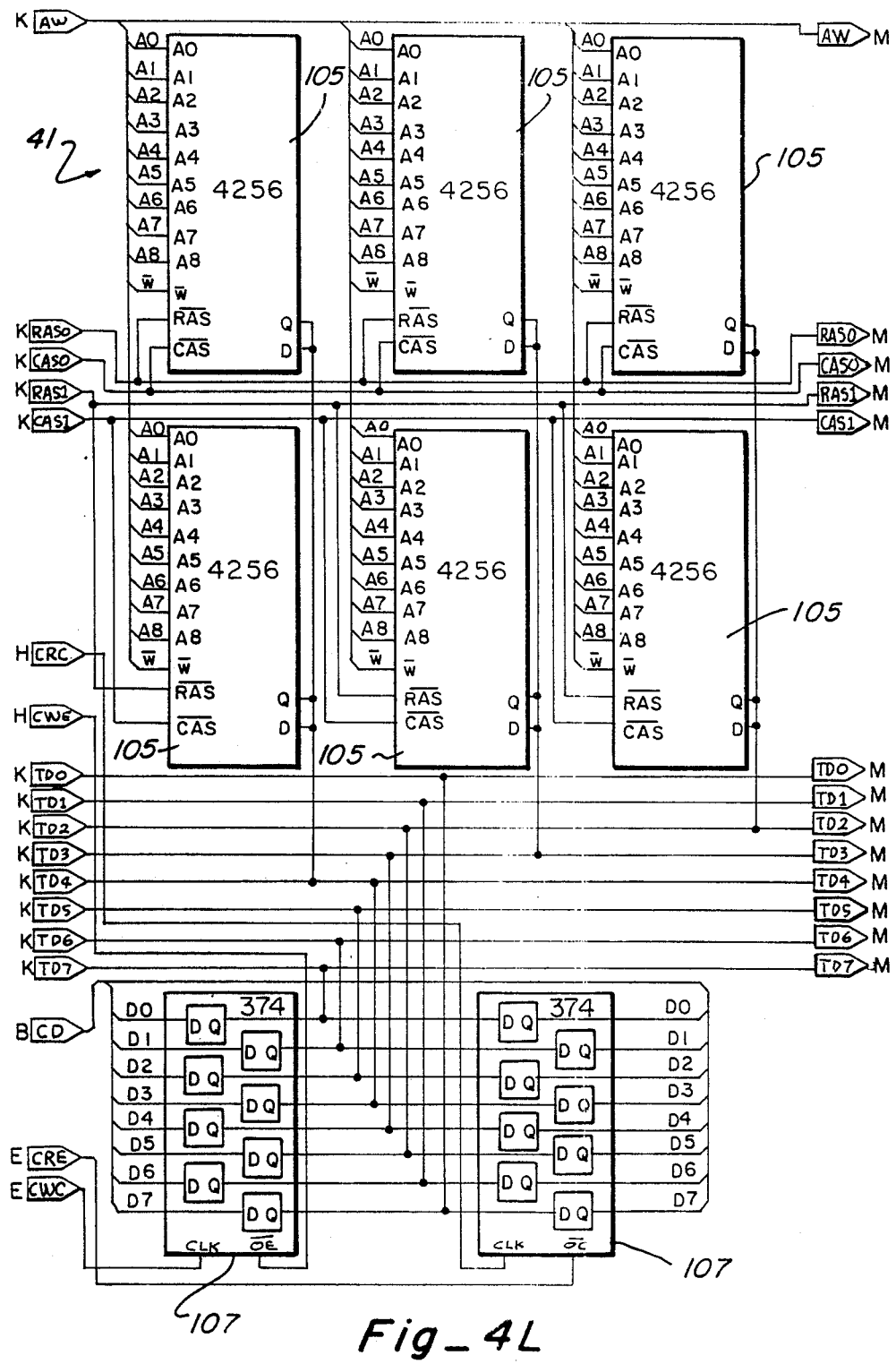
Fig_4L

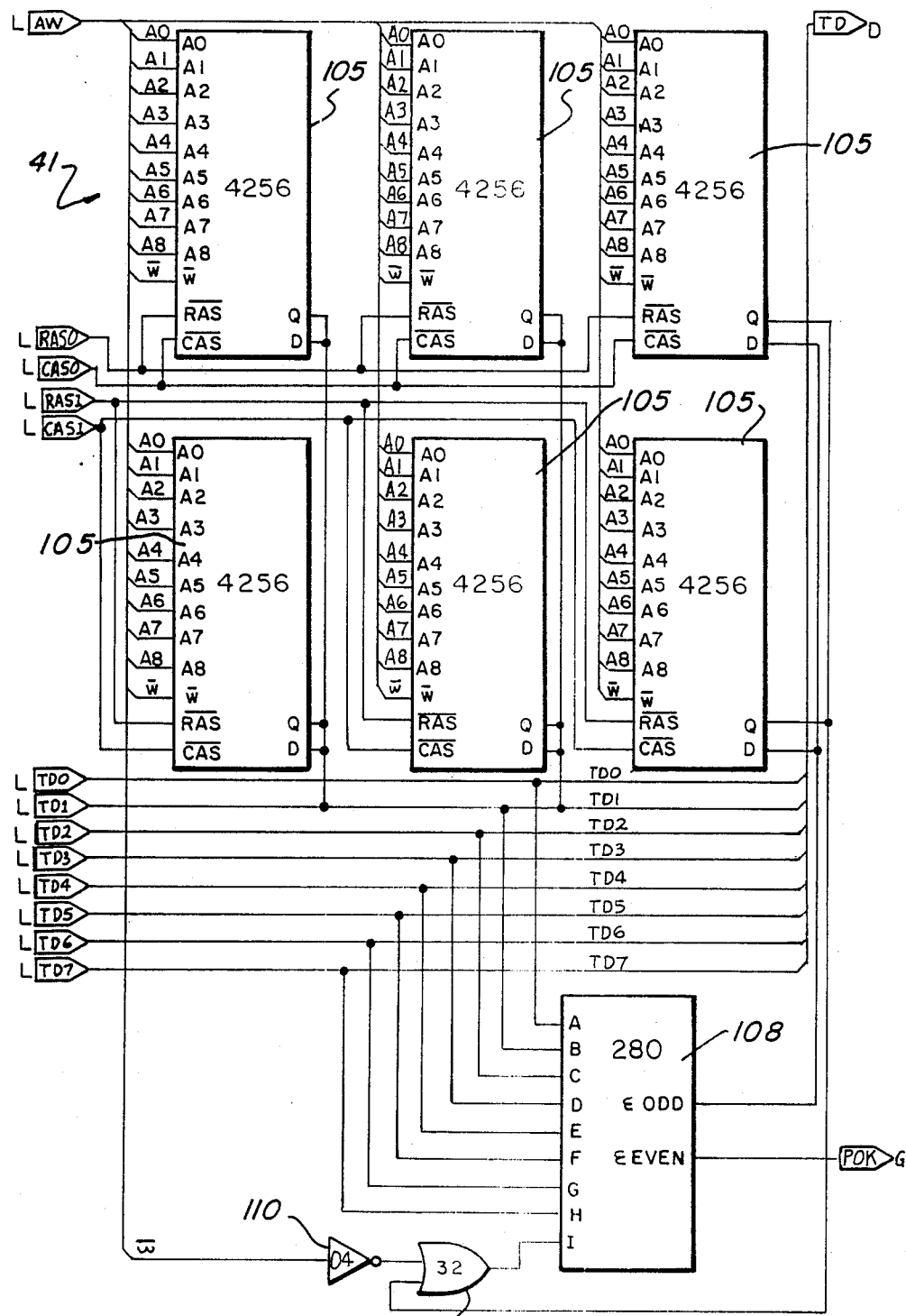
Fig_4M

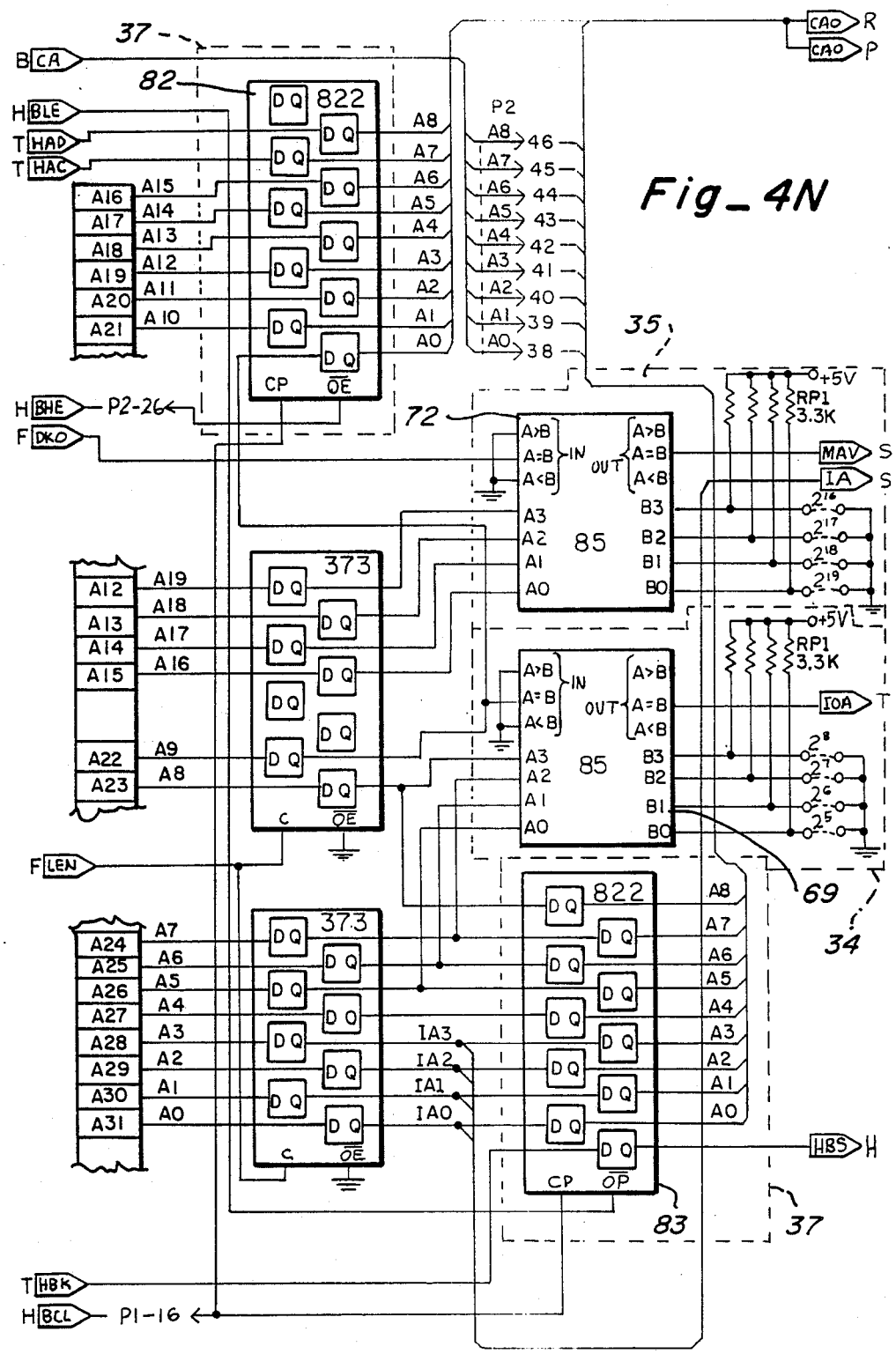
Fig_4N

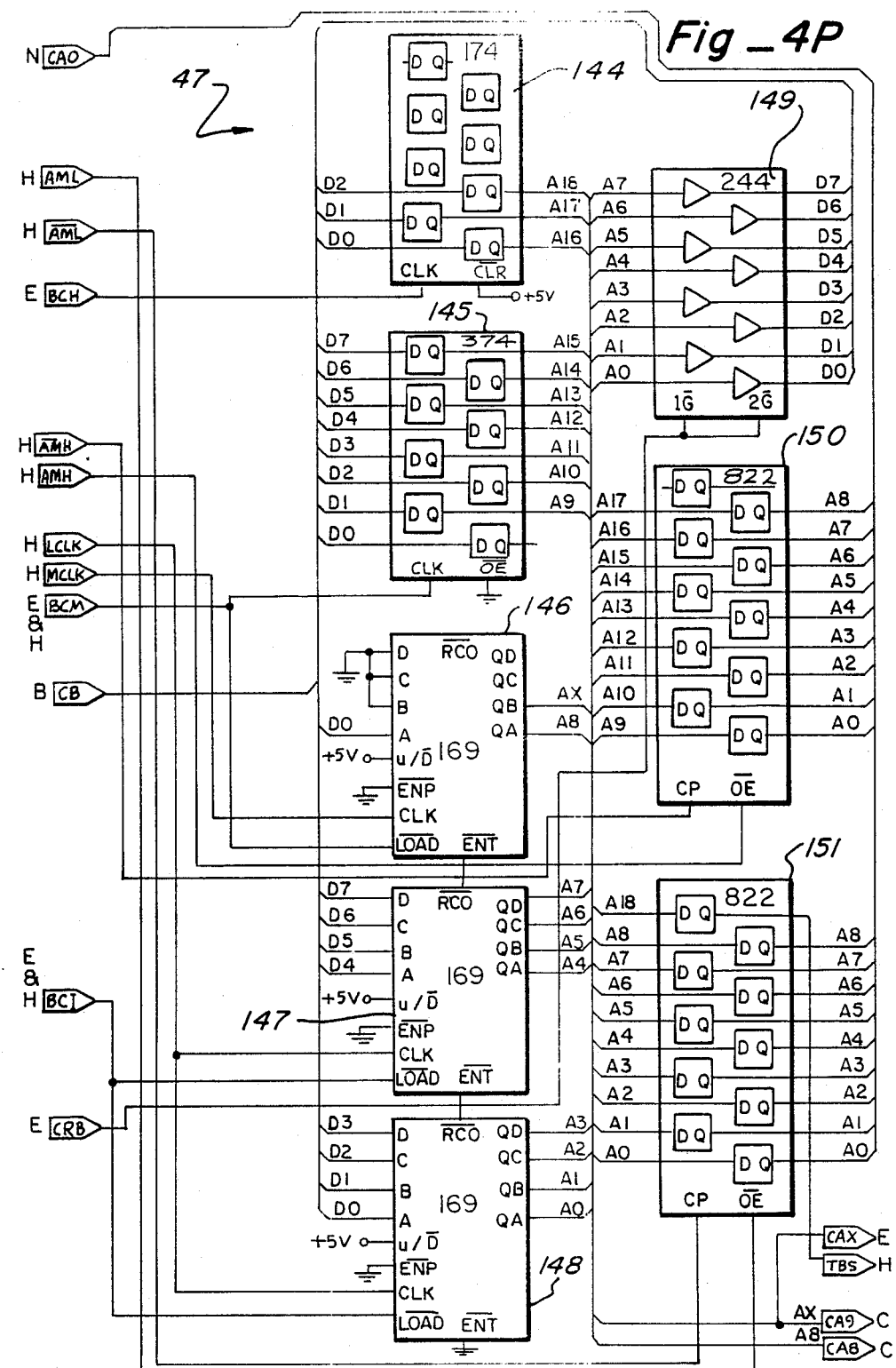
Fig_4P

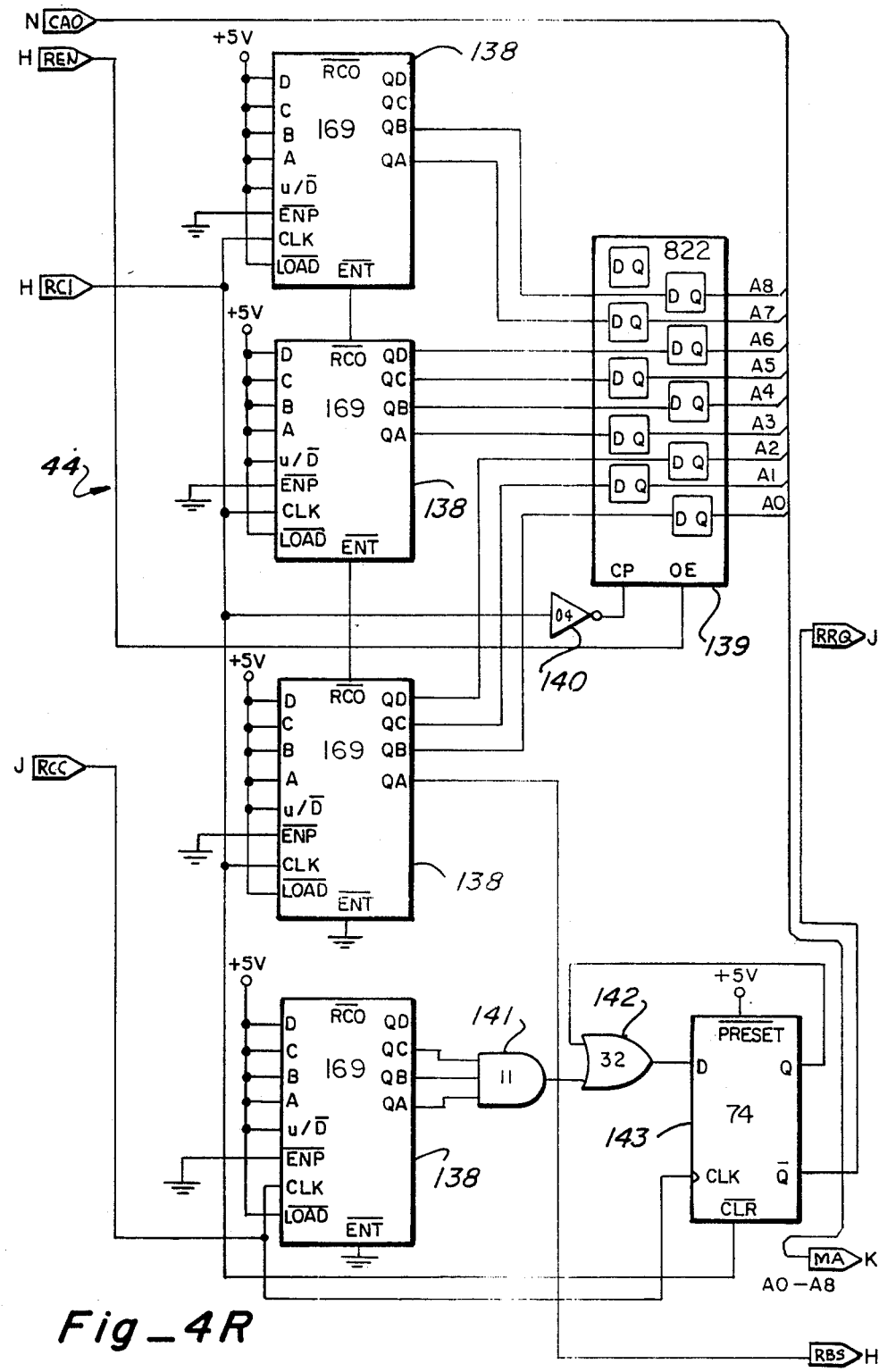
Fig_4R

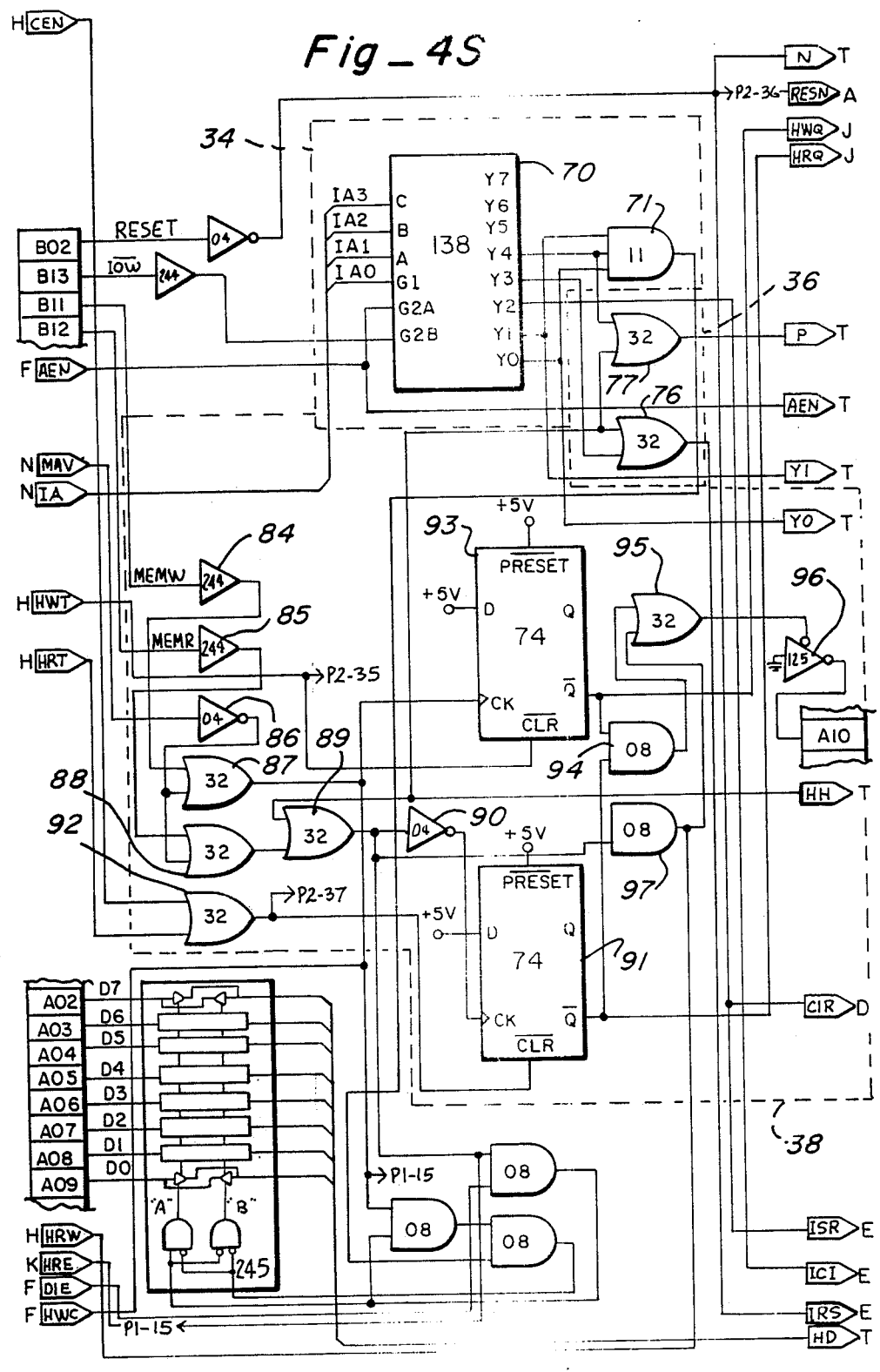
Fig_4S

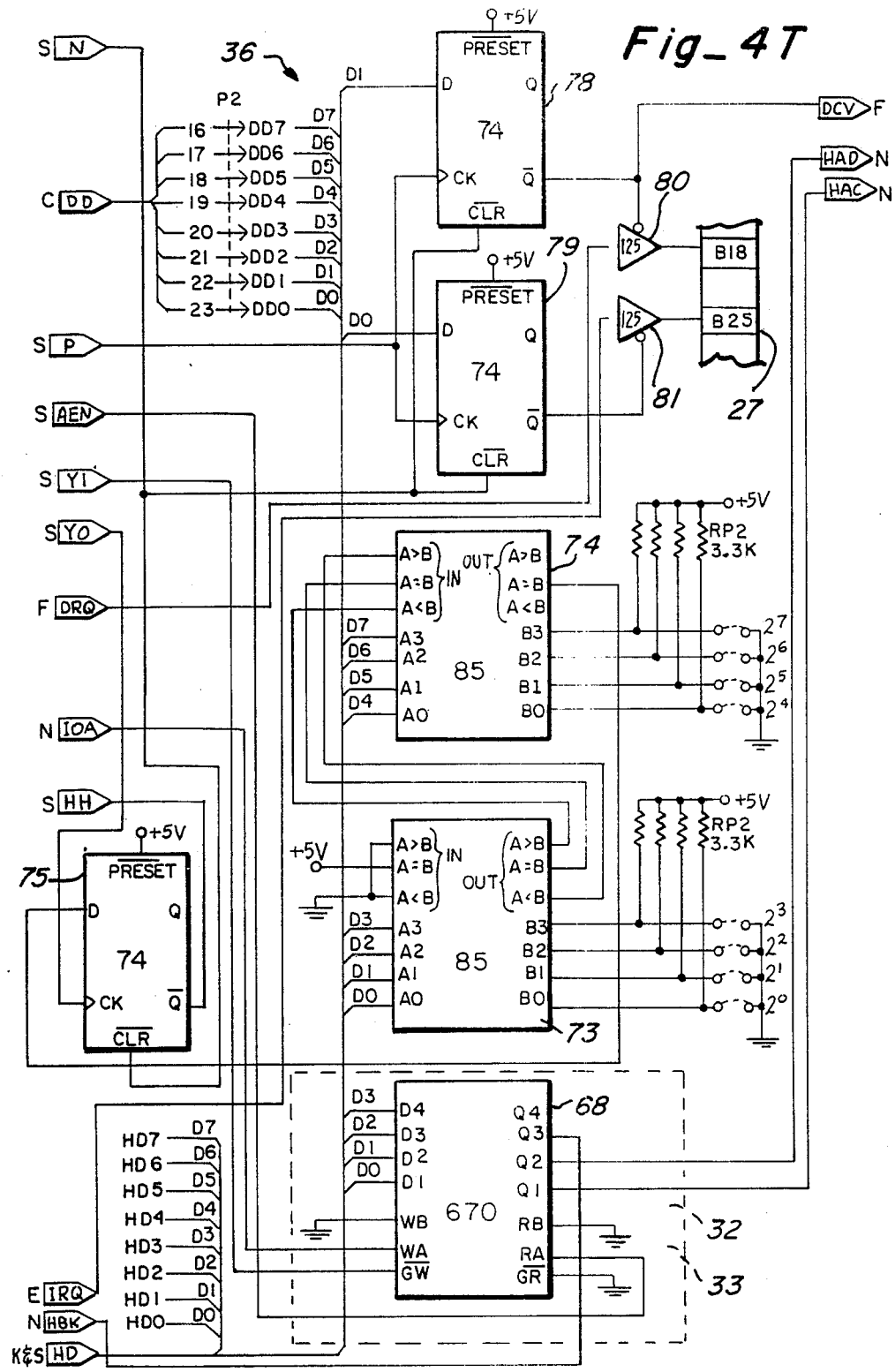
Fig_4T

TAPED DATA COPYING UTILIZING MULTIPLE ADDRESSABLE MEMORIES

FIELD OF THE INVENTION

This invention relates to data copying and, more particularly, relates to recorded data copying utilizing multiple addressable memories.

BACKGROUND OF THE INVENTION

It is oftentimes necessary, or at least desirable, to copy data stored on a media such as magnetic tape. It is likewise often desirable and/or necessary to generate multiple copies such as, for example, where copies are to be widely distributed.

In conventional data copying, a conventional (or, in some cases, a specialized) computer is used to read data into memory. A ring buffer is normally utilized to receive and maintain the data until it is used, or written out, to output devices. Since speed can be considered to be a measure of efficiency in data copying, the faster the computer provides information to the output devices and accepts data from the input devices, the more efficient the copying device.

As conventional computers only access data from a single location at a time, as more output devices are attached (as would be necessary to accommodate the generation of more concurrent copies, for example), greater computer speed is required to satisfy the additional request for data to be written.

In order to maximize copying speed, specialized computers have heretofore been developed with exceptionally high input-output speed (i.e., having high I/O bandwidth) capable of acknowledging up to three million independent I/O requests per second.

However, as increasingly dense, higher throughput data storage devices became more common, substantially higher data speeds became necessary. In order to obtain sufficient cycle speeds necessary to keep up with these devices, as well as to maintain a high copy fanout (typically 1 to 8), necessary speeds have been found to exceed those obtainable with conventional, inexpensive computer memory devices now known.

At the same time, however, the cost of conventional computer memory devices has been reduced so that utilization of a plurality of memories has become practical.

Various copying devices have been heretofore suggested in prior art patents, including a system for copying of data from a master disk onto a plurality of slave disks synchronized with the master disk (see U.S. Pat. No. 4,618,897), a system for copying of data from one tape to a second tape utilizing an optical storage device (see U.S. Pat. No. 4,320,486), and various systems for generating a plurality of tapes having digital information copied thereon from a master tape (see U.S. Pat. Nos. 3,805,284, 4,375,655 and 4,410,917). In addition, at least one such known system has also include circuitry for verifying data transferred (see U.S. Pat. No. 3,805,284).

As can be appreciated from the foregoing, while various systems have been heretofore suggested for providing multiple copies of information including multiple copies of taped digital information, such systems have normally utilized a single memory unit that is commonly associated with multiple copy producing units. This, however, has resulted in relatively slow copy generation where each copy is sequentially made by sequential accessing of the common memory. While concurrent production of copies from a single memory could speed up copy generation, such production has not been found practical due, at least in some instances, to loss of integrity of data copied and/or due to complications arising in compensating for varying characteristics of the various tape drive units utilized.

A need, therefore, has still existed for a system capable of dependably producing multiple copies of taped data at a relatively high rate of speed.

SUMMARY OF THE INVENTION

This invention provides an improved system and method for producing multiple copies of recorded data. The system utilizes multiple addressable memories, each of which is commonly connected to a computer bus so that data-indicative signals broadcast over the computer bus are written into each of the multiple memories and then later read from the memories and coupled to a plurality of copying units each of which is associated with a different one of the multiple memories to thereby enable rapid and yet dependable substantially simultaneous generation of multiple copies.

Whereas extending of conventional technology is normally achieved by using wider memory and data buses along with increased cycle speeds, this invention increases speed by providing multiple, identical memory images. With one memory image for each output, or copying, device, a controlling computer need not be fast enough to hand data to each output device independently. As each memory image receives the data broadcast on the computer bus as it is read by the input device, the memory images need only to cycle fast enough to handle two devices (i.e., the input device and the output device) independently of how many output devices are attached to the system. Moreover, as data is transferred directly from the input device to the multiple memory images of the output device during a single memory cycle, the host computer needs only to have sufficient bandwidth to read the data, and not necessarily enough to both read data and write out that data. In this invention, data is sent to the output device from the memory image as it is being read, instead of in preparation for being written as is the case with now known systems.

Utilizing this invention, a conventional personal computer (with an I/O bandwidth of 0.45 million bytes per second) can, for example, replace a specialized 3 million byte per second copying computer and still provide higher overall throughput (4 million bytes per second with a fanout of 8 output devices). When used with a standard high speed personal computer (I/O bandwidth of 1.2 million bytes per second), this invention can attain throughputs exceeding 10 million bytes per second when making 8 concurrent copies.

It is therefore an object of this invention to provide an improved system and method for producing multiple copies of data.

It is another object of this invention to provide an improved system and method for producing multiple copies of taped data utilizing multiple addressable memories.

It is still another object of this invention to provide an improved system for producing multiple copies of recorded data utilizing multiple memories connected with a computer bus to receive and store data-indicative signals broadcast thereon, which stored signals are coupled from each memory to an associated copying unit to thereby enable substantially simultaneous production of said multiple copies.

With these and other objects in view, which will become apparent to one skilled in the art as the description proceeds, this invention resides in the novel construction, combination, arrangement of parts and method substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which:

FIG. 1 is a perspective view of a housed unit incorporating the system of this invention therein for generating simultaneous copies of taped digital data;

FIG. 2 is a block diagram illustrating in simplified form the system of this invention;

FIG. 3 is an expanded block diagram of the memory and processing units shown in FIG. 2; and FIGS. 4A through 4H, 4J through 4N, 4P, and 4R through 4T, taken together, provide an electronic diagram of the memory and processing unit of this invention as shown in FIG. 3.

DESCRIPTION OF THE INVENTION

Figure 4A:
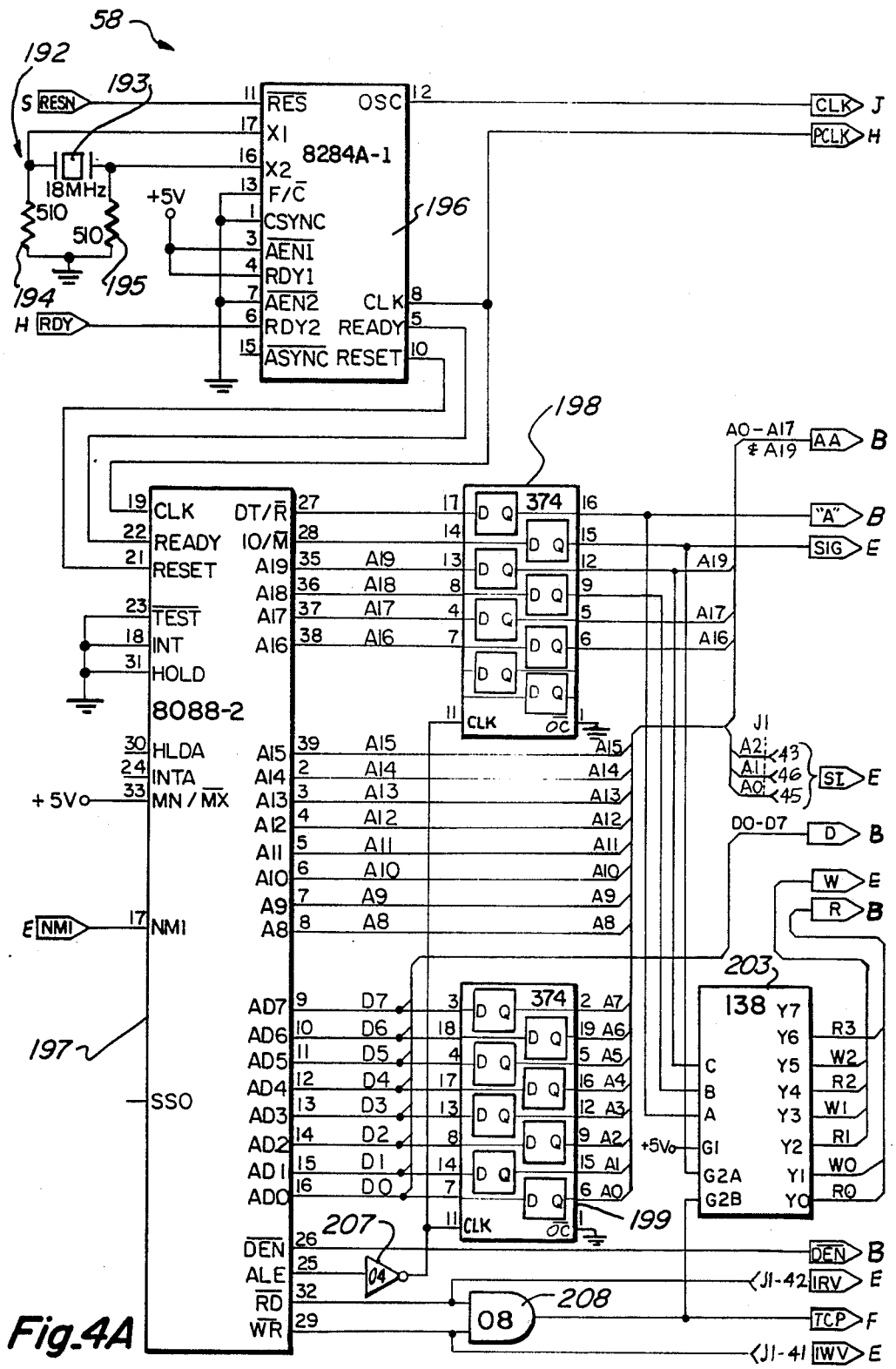

Housing 9, as shown in FIG. 1, includes racks 11 for receiving a master, or main, data input unit 12, and a plurality of data copying units 13. Master data input unit 12 receives cartridge 15 containing magnetic tape 16, which tape has data, preferably in digital form, written thereon. Each data copying device 13 likewise receives a cartridge 15 containing magnetic tape, which tape is utilized for copying of the data contained on the tape in the master unit.

While a specific master unit 12 is designated in housing 9, as indicated in FIG. 1, it is meant to be realized that the units shown can be varied so that any unit can be utilized as master tape unit 12 while the remainder of the units would be copy units 13. It is also meant to be realized that while eight units are shown in FIG. 1, any number could be utilized, and one or more such units not mounted within housing 9 could also be utilized. Likewise, it is meant to be realized that each unit 12 and 13 includes conventional tape drive mechanisms for driving the tape within a received cartridge, and also includes conventional read/write heads and associated circuitry for writing data onto the tape and reading data from the tape. In addition, disks and/or other mass storage media could be utilized instead of magnetic tape.

As shown in FIG. 1, a conventional computer 18, such as a personal computer, can be utilized, and this computer controls broadcasting of data on the computer bus to enable multiple copy generation of such data. As indicated, a keyboard 19 is preferably included to allow operator selection of at least the mode and number of copies to be made, and a cathode ray tube 20 is also preferably included for display purposes to facilitate data transfer.

Referring now to FIG. 2, a simplified block diagram illustrating the invention is set forth. As shown, data stored on magnetic tape at master unit 12 (i.e., data input unit 12 as indicated in FIG. 2), which data is preferably stored in digital form, is read and electrical signals indicative of the data are coupled through data input controller 22 to the host processor or computer 18. The signals from computer 18 are then broadcast on computer bus 23 to a plurality of memory and processing units 24 for storage of data-indicative information thereat. Each unit 24 is connected with a different one of data I/O units 25, and each unit 25 is connected with a different slave unit 13.

Each of the memory and processing units 24 may be identical and a unit 24 is shown in the block diagram of FIG. 3.

As shown in FIG. 3, the output from computer 18 is coupled through address, data and control computer I/O channel connector 27 to host processor interface unit 28. As indicated in FIG. 3 (and as set forth in greater detail in FIG. 4), host processor interface unit 28 includes MNI interrupt generator logic 30, IRQ interrupt generator logic 31, host CPU bank switch 32, host DMA bank switch 33, I/O decode logic 34, memory decode logic 35, slave select logic 36, address deferral logic 37, request grant logic 38, and host DMA control logic 39.

Host processor interface unit 28 is connected with memory unit 41 (512K bytes), and memory unit 41 includes multi-port prioritized memory arbiter 42, dynamic memory timing generator 43 and dynamic memory refresh generator 44, all of which are likewise shown in greater detail in FIG. 4.

Memory unit 41 is connected with tape drive interface unit 46, which unit includes sequential memory address generator 47, data registers 48, verify data logic 49, data comparator 50, interface control logic 51, status generator 52, read data logic 53, and write data logic 54, all of which are also likewise shown in greater detail in FIG. 4.

Tape drive interface unit 46 is connected with data output unit interface 56 (connected with a data I/O unit 25) and is also connected with host processor interface unit 28 and slave processor unit 58. Host processor unit 58 includes I/O decode logic 59 and request grant logic 60, both of which are also shown in greater detail in FIG. 4.

FIG. 4, taken in its entirety, illustrates one of the memory and processing units 24 as well as data input controller 22. Host processor interface unit 28 includes NMI interrupt generator logic 30 and IRQ interrupt generator logic 31. As shown in FIG. 4E, NMI interrupt generator logic 30 includes flip-flop 64, the Q output of which is connected to NOT gate 65. IRQ interrupt generator logic 31 includes flip-flop 66, the Q output of which is connected to NOT gate 67.

Host CPU bank switch 32 and host DMA bank switch 33 is implemented by register unit 68 (as shown in FIG. 4T). I/O decode logic 34, shown in FIG. 4S and 4N, includes comparator unit 69, decoder unit 70, and AND gate 71 connected with unit 70. Memory decode logic 35 is implemented by comparator unit 72. Slave select logic 36 includes comparator units 73 and 74 with unit 74 having an output which is connected with flip-flop 75, the Q output of which is connected through OR gates 76 and 77 to flip-flop 78 and enable register 79, the Q outputs from flip-flop 78 and enable register 79 being coupled through drivers 80 and 81 to PC I/O channel connector 27.

Address deferral logic 37 is implemented by register units 82 and 83. Request grant logic 38 includes receivers 84 and 85, and NOT gate 86, all of which are connected through OR gates 87, 88 and 89 and NOT gate 90 to flip-flop 91, which flip-flop also receives a CLEAR input through OR gate 92. Flip-flop 93 is also connected to receive the output from OR gate 87, and the Q outputs from flip-flops 91 and 93 are coupled through AND gate 94 and OR gate 95 to NOT gate 96 with OR gate 95 receiving a second input from AND gate 97.

Host DMA control logic 39 (shown in FIG. 4F) includes a plurality of receivers 99 connected with NAND gate 100 and serially connected OR gates 101 and 102.

Memory unit 41 is shown in FIG. 4K through 4M. As shown, memory unit 41 includes a plurality of RAMS 105 having register units 107 and 108 connected therewith with unit 108 having an input connected thereto through OR gate 109 and NOT gate 110. Memory unit 41 also includes multi-port prioritized memory address arbiter unit 42, shown in FIGS. 4H and 4J, which includes units 112, 113, 114, 115, and 116. Outputs of units 113 and 114 are coupled to unit 117, outputs of which are coupled through AND gate 118 and NOT gates 119 and 120. Outputs of units 115 are coupled to AND gate 121 and through AND gate 122 to AND gate 123, the output of which is coupled to decoder unit 124. An output from unit 114 is coupled through NT gate 125 to AND gate 126 and to AND gate 127, with gates 126 and 127 receiving a second input from AND gates 128 and 129, respectively. Outputs from unit 115 is coupled through AND gates 130 and 131 providing an input to NAND gates 132 and 133, respectively, with the AND gates receiving a second input from unit 115 with the input to AND gate 131 being coupled through NOT gate 134.

Dynamic memory timing generator 43 of memory unit 41 includes shift register unit 135 for outputs of which are coupled through a plurality of NAND gates 136. Dynamic memory refresh generator unit 44 (FIG. 4R) includes four counter units 138, the outputs from three of the units being coupled through register unit 139 (having a CP input coupled thereto through NOT gate 140) and the output from the fourth unit being coupled through AND gate 141 and OR gate 142 to flip-flop 143.

Tape drive interface unit 46 includes sequential memory address generator unit 47. Unit 47 includes register unit 144 and register unit 145, counter unit 146, counter unit 147 and counter unit 148, all of which are connected through common bus to driver units 149, and register units 150 and 151. Unit 47 also includes OR gate 152 and NOT gate 153 (shown at FIG. 4E).

As shown in FIGS. 4C and 4D, data register unit 48 is implemented by register unit 155. Data comparator unit 50 includes comparator unit 157 and comparator unit 158 with the output from unit 157 being coupled through AND gate 159 to flip-flop 160. Interface control logic unit 51 includes units 162, 163 and 164 with the output from unit 162 being coupled through NOT gate 165, and another output from unit 162 being coupled through AND gate 166 to unit 164. Status generator unit 52 includes flip-flop 168 and unit 169 with the one input to unit 168 being coupled thereto through NOT gate 170.

Verify data logic unit 49 includes AND gates 172, 173 and 174, the outputs from which are coupled to flip-flops 175 and 176, with the output from flip-flop 176 being coupled through NOT gate 177 (as shown in FIG. 4F). Read data logic unit 53 includes AND gates 179 and 180 connected with flip-flops 181 and 182. Write data logic unit 54, in FIG. 4G, includes AND gate 184 connected with flip-flop 185 the Q output of which is coupled through OR gate 186 to AND gate 187, and with a second input to OR gate 186 being coupled thereto through NOT gate 188, with the output from NOT gate 188 being coupled to OR gate 189 receiving a second input as from the Q output of flip-flop 190, which flip-flop receives a CLEAR input from AND gate 191.

FIG. 4A and 4B show slave processor unit 58 which includes a clock generator 192 implemented by crystal 193 and resistors 194 and 195 the output of clock generator being coupled to clock generator unit 196. The output from unit 196 is coupled to processor unit 197, the outputs from which are coupled to unit 198, 199, 200, 201, 202 and 203. ROM unit 204 and RAM unit 205 are coupled to unit 206. One output from unit 197 is coupled through NOT gate 207 to the clock inputs of units 198 and 199, and another output through AND gate 208 to unit 203.

As shown in FIG. 4E, address decode logic unit 59 of slave processor unit 58 includes units 210 and 211. Request grant logic unit 60 of slave processor unit 58 includes AND gates 213 and 214, the output of AND gate 213 being coupled to AND gate 215 and flip-flop 216, while the output of AND gate 214 is coupled through NOT gate 217 to flip-flop 218. The Q outputs from flip-flops 216 and 218 are coupled through AND gate 219 and NOT gate 220.

In operation, the operator selects the mode and number of copies to be made, ensuring that a tape cartridge is placed in each unit 13 in which a copy is to be made. The master tape cartridge is also placed in master unit 12, and operation is commenced.

Data is read from magnetic tape by master unit 12 through the tape drive interface unit 46 to the host processor interface unit 28. The presence of valid data is indicated by the master unit to the read data logic 53 through OR gate 152 and NOT gate 153, posting a request for a direct memory access cycle (DMA cycle) stored in flip-flop 181 through host DMA control logic 39 and driver 80. Upon acknowledgment of the valid DMA read cycle as qualified by receiver 99 and OR gates 101 and 102, the request for direct memory access is cleared at flip-flop 181 and a request for a subsequent byte of data is posted in flip-flop 182.

During the DMA cycle, data is presented upon host processor I/O channel connector 27 where it is broadcast over the host computer bus 23 from memory and I/O interface unit 18 to identical units 24. Units 24 are attached to data I/O units 25 for data output to slave units 13.

As DMA read cycles appear to memory as write cycles, all memory units 24 on bus 23 receive the data to be stored in memory. Host processor 18's DMA facility provides the address and control information to store the data presented on bus 23 during DMA read cycles as a conventional write operation to memory. Thus, data is transferred to the plurality of memories to be written to units 13.

Data is presented over host processor 18 I/O channel connector at addresses specified by the host processor's DMA logic. The actual data is temporarily stored by the host processor into register units 107 of units 24, while the address to which the data is to be stored is temporarily stored in the address deferral logic unit 37 in registers 82 and 83. Host processor 18 indicates that data and addresses are to be stored by setting a request for memory write cycle in flip-flop 93. When a memory cycle is made available by the multi-port prioritized memory arbiter unit 42, the address and data are presented to RAMS 105 and he request for memory write cycle in flip-flop 93 is cleared.

At a later time when it is appropriate for the data to be fetched from the memory as indicated by flip-flop 185 of write data logic unit 54, a request is made to multi-port prioritized memory arbiter unit 42 for a memory cycle. When a memory cycle is granted, the request for memory cycle in flip-flop 185 is cleared and data that is fetched from the address specified by sequential memory address generator unit 47 is stored in data register 155, from which it is sent over the data output unit interface 56.

At the end of the memory cycle a request to transfer data to the tape drive is posted at flip-flop 190. When data output unit 25 acknowledges the data, the request to transfer data at flip-flop 190 is cleared and a subsequent request for the next sequential byte of memory is posted in flip-flop 185. Upon completion of transferring 511 bytes, the OR gate 152 of the sequential address generator unit 47 gates off subsequent transfer requests, allowing separation of data transfers into 512 byte blocks. AND gate 184 allows slave processor 58 to request a memory transfer on write operations directly so that the first byte of a block is sent to a tape drive, as it is not requested as the result of a prior completed cycle.

In addition to being able to write data to tape, verify data logic 49 provides a method for comparing data stored in multi-port prioritized memory unit 42 with that read from tape in units 13. The presence of data to be verified from the tape is indicated in flip-flop 175 and a request is posted for a memory cycle to multi-port prioritized memory arbiter unit 42. When a memory cycle is granted, the request for memory cycle in flip-flop 175 is cleared and data that is fetched from the address specified by sequential memory address generator unit 47 is compared with incoming data from data output unit interface 56, with any discrepancies causing flip-flop 160 to be latched. At the end of the memory cycle, a request for more data from the tape drive is posted at flip-flop 176. As with writing data to tape, the OR gate 152 of sequential address generator unit 47 gates off subsequent transfer requests, allowing separation of data transfers into 512 byte blocks.

Multi-port prioritized memory unit 42 allows data to be stored from both host processor 18 and slave processor 58, and fetched by the host processor, slave processor and tape drive interface 46. Additionally, requests for memory refresh cycles from unit 44 are resolved by multi-port prioritized memory arbiter unit 42.

Requests for memory cycles are posted asynchronously to unit 112. The requests are resolved according to priority, with requests from host processor 18 assigned a higher priority than that for refresh from generator 44, with requests from slave processor 58 receiving still lower priorities, and requests for transfers to the tape write and verify logic at taped drive interface 46 receiving the lowest priority. Write transfers receive higher priorities than read transfer cycles from the same device.

Prior to each memory cycle, the request posted to unit 112 is clocked and the priority is resolved by unit 113. The low order address bits of the highest priority requested are then enabled on to the multiplexed memory address bus by unit 117. The identity of the request having the highest priority is made available to pipeline latches 114 and 115 and address multiplexor logic unit 116. On the next clock cycle, the low order memory address bits are clocked into the memory address multiplexor unit 107, and the identity of the highest priority requested and highest order address bits are clocked into the first pipeline latch unit 114.

On the next clock cycle the high order address bits of the highest priority requests are enabled on the multiplexed memory address bus, while the low order memory address bits are strobed into the appropriate bank of memory units 105 by the row address strobe (RAS) decoder consisting of gates 125, 126, 127, 128 and 129, which decodes the appropriate bank of memory as selected by the latched high order address bit from the first pipeline latch unit 114 Additionally, the appropriate data to be written to memory is enabled to memory units 105 as decoded by unit 124. The decoding of the appropriate requests by decoder unit 124 is also used to cancel out outstanding requests for memory cycles as posted in flip-flops 91, 93, 216 or 218.

The next clock cycle clocks the high order address bits into memory address multiplexor unit 107 and clocks the identity of the highest priority requestor, highest order address bit and wait state status of slave processor 58 into the second pipeline latch unit 115, which also decodes the memory read or write line indicating the type of cycle to memory. The next clock cycle strobes the high order address bits into the appropriate bank of memory units 105 using the column address strobe (CAS) decoder consisting of gates 130, 131, 132, 133, 134, and asserts the appropriate decoded strobe at decoder 124 for latching data from memory into register unit 155, one of two register units 107, or verify compare status in flip-flop 160.

The next clock cycle disables the high order address bits from the multiplexed memory address bus in preparation for the next memory cycle, which begins concurrent to this clock cycle. The next clock cycle releases the strobe decoded in unit 124, clocking the data fetched from memory into one of two register units 107 if appropriate.

The timing for the memory cycles comes from the dynamic memory timing generator unit 43. This unit consists of a linear feedback shift register unit 135 which clocks itself through six states before repeating. The clock stimulus comes from clock generator unit 196, oscillating at a rate established by crystal 193. Timing signals for memory are established by decoding memory states through NAND gates 136.

The dynamic memory refresh generator unit 44 consists of a chain of binary counters units 138 driving an address register unit 139, which in turn drives the multiplexed memory address bus during refresh cycles. AND gate 141 decodes one of each eight memory cycles, and posts a refresh request in flip-flop 143 every eight memory cycles. The refresh cycles are alternately distributed between the two memory banks.

Slave processor unit 58 consists of a standard microprocessor unit 197 and three separate memories as well as program input and output. Addresses to the multiplexed memory address bus are passed through register units 200 and 202. High order addresses are latched by unit 198 and decoded by unit 203 into ranges valid for multi-port prioritized memory unit 41, the local static read/write memory (RAM) unit 205 and the local read only memory (ROM) unit 204. Requests for memory write cycles to multi-ported prioritized memory unit 41 are combined at AND gate 213 and posted in flip-flop 216 on the trailing edge of the write request. Requests for memory read cycles to multi-ported prioritized memory unit 41 are combined at AND gate 214 and posted in flip-flop 218 on the leading edge of the read request. The requests are combined at AND gates 219 and 215 and unit 116 to indicate that requests are outstanding and inform slave processor 58 that memory is not ready.

Slave processor programmed input and output (I/O) requests are decoded by units 211 and 210 of decode logic unit 59, respectively. These requests allow slave processor 58 to perform various control and status functions, including requesting interrupt processing (IRQ) service from host processor 18 stored in flip-flop 64, clearing non-maskable interrupt processing requests (NMI) initiated by host processor 18 stored in flip-flop 66, setting initial values into sequential memory address generator unit 47, sending command data and receiving status data from tape drive interface unit 46, enabling data to be sent from various sources out through interface 56 via unit 162, controlling command signals and selectively enabling tape read, write or verify logic via unit 163, clearing verify error status indicated in flip-flop 160, clearing parity error status, reading status information available in unit 169, reading current sequential address generator count from drive units 149 and clearing ready latch unit 168.

Host processor interface unit 28 provides various functions normally associated with memory, I/O and DMA functions of a conventional computer memory and I/O channel interface. In addition, functions specialized for broadcasting data to a plurality of memory images are also provided. Host processor addresses are decoded during non-DMA operations and only enabled when the higher I/O address bits match those selected using the jumpers connected to unit 69 (in FIG. 4N).

I/O decode logic unit 34 utilizes decoder unit 70 to decode five different output operations. No input operations are provided for the host processor programmed I/O. Three of the decoded output operations are decoded by AND gate 71 to use data driven from the host processor I/O channel.

Slave select logic unit 36 compares data from the host processor I/O channel at comparator units 73 and 74 with data selected by jumpers connected to comparator units 73 and 74 (in FIG. 4T). The result of the comparison is stored in flip-flop 75, such that subsequent operations that are gated by the slave select status are only enabled when the memory processing unit 24 (or data input controller 22 as the case may be) is selected. This allows multiple memory units 24 to occupy the same logical memory I/O address spaces yet selectively respond to non-broadcast commands.

Non-maskable processor interrupt request (NMI) generation logic 30 allows host processor 18 to post an NMI request in flip-flop 64 to a slave processor 58, which may then clear that request. This operation is gated by OR gate 76 so that only the selected slave processor is interrupted. This can be used for command initiation to discriminate commands between multiple slave processors.

Host processor interrupt request (IRQ) generation logic 31 allows data input controller 22 to post a prioritized interrupt request to host processor 18 in flip-flop 66. Driver 81 requests the interrupt and is gated by enable register 79 so that controller 22 may be separately enabled or disabled driving the IRQ request.

Host processor DMA control logic unit 39 similarly allows a selected slave processor 58 to be enabled or disabled driving the DMA request. Receivers 99, and OR gates 101 and 102 qualify the DMA acknowledge signal, and flip-flop 78 enables or disables the DMA request driver. OR gate 102 is only enabled when flip-flop 78 is enabled. Additionally, receivers 99 decode valid bus operations so that non-valid addresses are not propagated or recognized.

Host processor memory decode logic unit 35 compares addresses (at comparator unit 72) on the host processor bus with those selected by jumpers connected to unit 72 (as shown in FIG. 4N). All memory write operations that occur when these are decoded, as well as memory read operations that occur when the particular unit 24 (or 22) is selected, are passed as valid requests to multi-port prioritized memory unit 41. Only the selected unit responds to read requests, allowing memory 41 of each unit to be separately interrogated for status and communications information.

Host processor CPU bank switch unit 32 stores additional high order memory address bits in register unit 68 for use during accesses by host processor 18 during non-DMA access to multi-port prioritized memory unit 41.

Host processor DMA bank switch unit 33 also stores additional high order memory address bits in register unit 68 for use during accesses by host processor 18 during DMA access to multi-port prioritized memory unit 41. This allows concurrent access by DMA as well as the processor to different areas of the common memory, so that the memory may be used simultaneously for data transfers as well as communications.

Copy operations commence through initiation by a program executing in the host processor (computer 18). The host processor polls all installed slave processors 12 and 13 to find when one is attached to a tape drive containing a tape which has been set to the "safe", non-recordable position. This unit is then selected as master tape unit 12 including controller 22, and the remaining units are chosen as copy units 13 for write functions using memory and processing units 24 if they contain tapes set to the "unsafe" recordable position. Once a preselected number of tapes is available, commands are sent to units 24 to initiate rewinding, retensioning, copying and/or verifying. The host processor 18 then requests a read operation from the data input controller 22 which then brings a block of data through the host processor's DMA facility, as set forth hereinabove, interrupting upon completion of the block transfer. This process is repeated, with status information passed back from data input controller 22 to indicate error and exceptional conditions. The host processor 18 maintains a ring buffer of data as it is read in, together with information posted to all memory units 24 indicating the progress of the read operation. Units 24, servicing write operations or verify operations, in turn pass back progress information to host 18 allowing the host to determine the amount of buffering in use and the availability of buffer space.

The device thus causes the data image to be copied onto each memory unit, and data from the memory unit is then copied onto the tape cartridge in each associated slave copying unit. The entire operation is rapid and yet dependable. In each instance, the drive is operated at a speed sufficient to allow continuous streaming operation.

This invention thus provides in improved device for generating multiple copies of taped digital data.

What is claimed is:

1. A device for generating multiple copies of data stored on a master, said device comprising:

means for reading said data stored on said master and, without contemporaneous storage of a substantial amount of said data thereat, providing output indicia indicative thereof;

a broadcast line for receiving said indicia from said read means and directly broadcasting said indicia thereon;

a plurality of memory means connected with said broadcast line so that each of said plurality of memory means receives said indicia and stores a representation thereof, and with each of said memory means providing from said representations said indicia as the output therefrom; and a plurality of copying means each of which is connected with a different one of said plurality of memory means to receive said indicia therefrom, each of said copying means, responsive to receipt of said indicia from said memory means connected therewith, generating a copy of said master.

2. The device of claim 1 wherein said indicia is in the form of electrical signals, wherein said broadcast line is a computer bus, and wherein representations of said electrical signals are stored in each of said plurality of memory means.

3. The device of claim 2 wherein each of said plurality of copying means, responsive to receipt of said electrical signals from said memory means, generates said copy of said master therefrom.

4. The device of claim 1 wherein said master is magnetic tape having digital data stored thereon, wherein said device further comprises computer means for receiving electrical signals indicative of said digital data stored on said magnetic tape and responsive thereto providing for storage of said representations into each of said plurality of memory means, and wherein said broadcast line is a computer bus having said electrical signals broadcast thereon.

5. The device of claim 1 wherein said device includes control means for causing said plurality of copying means to substantially simultaneously generate said copies of said master.

6. The device of claim 5 wherein said control means includes computer means.

7. A device for substantially concurrently generating multiple copies of data stored on magnetic media, said device comprising:

read means for reading said magnetic media having said data stored thereon to be copied and, without contemporaneous storage of a substantial amount of said data thereat, providing electrical signals indicative thereof;

electrical signals coupling means for receiving said electrical signals from said read means, said electrical signal coupling means including a broadcast bus for directly broadcasting said electrical signals thereon;

a plurality of memory means connected with said broadcast bus for receiving said electrical signals on said bus and enabling substantially simultaneous writing of said data into each of said plurality of memory means;

a plurality of write means each of which is capable of writing data on magnetic media associated therewith;

a plurality of outputting means connecting each of said plurality of write means with a different one of said plurality of memory means; and control means for causing said data to be written into said plurality of memory means and to cause said data in said plurality of memory means to be read therefrom and coupled to said associated ones of said plurality of write means whereby said write means are caused to substantially concurrently generate said multiple copies of said data.

8. The device of claim 7 wherein said magnetic media is magnetic tape, and wherein said multiple copies are generated on said magnetic tape.

9. The device of claim 7 wherein said control means includes computer means.

10. The device of claim 7 wherein each of said plurality of memory means has processing means associated therewith.

11. The device of claim 10 wherein said processing means includes means for verifying said data on said generated copies.

12. The device of claim 10 wherein said processing means includes a control means interface unit, a tape drive interface unit, and a slave processor unit.

13. The device of claim 12 wherein said control means interface unit includes means for enabling each of said plurality of memory means to be individually accessed.

14. The device of claim 12 wherein said host processor interface unit includes NMI interrupt generation logic means, IRQ interrupt generator logic means, host CPU bank switch means, host DMA bank switch means, I/O decode logic means, memory decode logic means, slave select logic means, request grant logic means, host DMA control logic means and address deferral logic means.

15. The device of claim 12 wherein said tape drive interface unit includes sequential memory address generator means, data registers, data comparator means, interface control logic means, status generation means, verify data logic means, read data logic means, and write data logic means.

16. The device of claim 12 wherein said slave processor unit includes I/O decode logic means and request grant logic means.

17. The device of claim 12 wherein said memory means includes multi-port prioritized memory arbiter means, dynamic memory timing generator means, and dynamic memory refresh generator means.

18. A method for generating multiple copies of data stored on a master, said method comprising:

reading said data stored on said master and, without contemporaneous storage of a substantial amount of said data thereat, providing electrical signals representative of said data stored on said master;

directly broadcasting said electrical signals on a broadcast line;

receiving said electrical signals on said broadcast line and storing indicia indicative of said data at a plurality of memory means; and causing electrical signals indicative of said indicia stored at each of said plurality of memory means to be generated and coupled to an associated copying means to thereby enable substantially concurrent generation of said multiple copies.

19. The method of claim 18 wherein said method includes providing a computer and utilizing the computer bus of said computer as said broadcast line.

20. The method of claim 19 wherein said plurality of memory means are addressable and commonly connected with said computer bus whereby said electrical signals are concurrently coupled to each of said plurality of memory means.

21. The method of claim 18 wherein said method includes comparing said data on said multiple copies with said data stored on said master to thereby verify the integrity of the data copied.

* * * * *

UNITED STATES PATENT AND TRADEMARK OFFICE
CERTIFICATE OF CORRECTION

PATENT NO. : 4,899,230

DATED : February 6, 1990

INVENTOR(S) : Jay G. Sherritt

It is certified that error appears in the above-identified patent and that said Letters Patent is hereby corrected as shown below:

Column 7, line 6, "he" should be --the--.

Column 11, line 8, before "means" insert --read--.

Signed and Sealed this

Twenty-ninth Day of January, 1991

*Attest:*

HARRY F. MANBECK, JR.

*Attesting Officer*    *Commissioner of Patents and Trademarks*